(12) United States Patent
Miyazawa et al.

(10) Patent No.: US 9,860,231 B2
(45) Date of Patent: Jan. 2, 2018

(54) RELAY APPARATUS, COMMUNICATION APPARATUS AND RELAY METHOD

(75) Inventors: Masafumi Miyazawa, Nagoya (JP);
Yusuke Shimada, Inazawa (JP);
Takeshi Nagasaki, Nagoya (JP);
Kazutaka Yamamoto, Nagoya (JP);
Hirokazu Banno, Iwakura (JP);
Satoshi Watanabe, Nagoya (JP);
Katsuaki Ito, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 13/288,766

(22) Filed: Nov. 3, 2011

(65) Prior Publication Data
US 2012/0117629 A1    May 10, 2012

(30) Foreign Application Priority Data

Nov. 4, 2010   (JP) ................................. 2010-247650
Oct. 12, 2011   (JP) ................................. 2011-224573

(51) Int. Cl.
*H04L 29/06*        (2006.01)
*G06F 21/62*        (2013.01)

(52) U.S. Cl.
CPC ...... *H04L 63/0807* (2013.01); *G06F 21/6209* (2013.01); *H04L 63/08* (2013.01);
(Continued)

(58) Field of Classification Search
CPC . H04L 63/08; H04L 63/0807; H04L 63/0892; H04L 63/10; H04L 63/101;
(Continued)

(56) References Cited

U.S. PATENT DOCUMENTS 7,792,601 B2 *   9/2010   Okigami ...................... 700/100
8,270,020 B2 *   9/2012   Abe ............................. 358/1.15
(Continued)

FOREIGN PATENT DOCUMENTS

| CN | 10-1115116 A | 1/2008 |
|----|--------------|--------|
| CN | 10-1176064 A | 5/2008 |
| JP | 2005-269250 A | 9/2005 |

OTHER PUBLICATIONS

Chinese Office Action issued in application No. 201110345180.3, dated Jan. 30, 2014.

*Primary Examiner* — Zachary A Davis
(74) *Attorney, Agent, or Firm* — Merchant & Gould P.C.

(57) ABSTRACT

A relay apparatus is connected to a communication apparatus, a service providing apparatus and a browser-equipped apparatus. The relay apparatus includes: a registering unit registering provisional registration information, the provisional registration information being used in an authentication procedure performed between the service providing apparatus and the browser-equipped apparatus; an acquiring unit acquiring permission information representing that use of the service is permitted, the permission information being issued by the service providing apparatus in the authentication procedure; a communication unit transmitting the provisional registration information to the browser-equipped apparatus; a receiving unit receiving input information transmitted from the communication apparatus, the input information being generated in response to the provisional registration information; and a communication unit transmitting the permission information to the communication apparatus which has transmitted the input information if the receiving unit receives the input information.

11 Claims, 8 Drawing Sheets

(52) U.S. Cl.
CPC ........ *H04L 63/0892* (2013.01); *H04L 63/101* (2013.01); *H04L 63/102* (2013.01); *H04L 2463/102* (2013.01)

(58) Field of Classification Search
CPC . H04L 63/102; H04L 2463/102; G06F 21/60; G06F 21/62; G06F 21/6209
USPC .................. 726/3–7, 10; 713/155; 709/229; 705/51; 358/407
See application file for complete search history.

(56) References Cited

U.S. PATENT DOCUMENTS

| | | | |
|---|---|---|---|
| 8,576,422 B2* | 11/2013 | Kimura | 358/1.14 |
| 8,867,070 B2* | 10/2014 | Jazayeri et al. | 358/1.15 |
| 2006/0227367 A1* | 10/2006 | Kitada | 358/1.15 |
| 2008/0027569 A1 | 1/2008 | Okigami | |
| 2009/0303531 A1* | 12/2009 | Abe | 358/1.15 |
| 2010/0171973 A1* | 7/2010 | Kimura | 358/1.14 |
| 2011/0032571 A1 | 2/2011 | Kitada | |
| 2011/0235085 A1* | 9/2011 | Jazayeri et al. | 358/1.14 |
| 2012/0081743 A1 | 4/2012 | Watanabe et al. | |
| 2012/0084402 A1 | 4/2012 | Ito et al. | |

\* cited by examiner

FIG. 2A

REGISTRATION INFORMATION DB (104a)

| SERVICE ID | ACCOUNT NAME | PASSWORD | ACCESS TOKEN |
|---|---|---|---|
| SERVICE_A | Tommy | 11111 | ABCDEF···· |
| SERVICE_A | Terry | 22222 | FEDCBA···· |
| SERVICE_B | Terry | 33333 | ABCCBA···· |

FIG. 2B

PROVISIONAL REGISTRATION INFORMATION DB (204d)

| PROVISIONAL REGISTRATION ID | AUTHENTICATION TOKEN | SERVICE ID |
|---|---|---|
| qqBc8MfW | 0dd53ab761e09dff8a5 | SERVICE_A |
| ZwOU1C1d | 6420b5edf0a56989eef | SERVICE_A |
| 7usHNwXO | 97490973aa154bdfe99 | SERVICE_B |
| ···· | ···· | ···· |

RELAY APPARATUS, COMMUNICATION APPARATUS AND RELAY METHOD

CROSS-REFERENCE TO RELATED APPLICATION

This application is based upon and claims the benefit of priority of Japanese Patent Applications No. 2010-247650 filed on Nov. 4, 2010 and No. 2011-224573 filed on Oct. 12, 2011, the contents of which are incorporated herein by reference in their entirety.

BACKGROUND

The present disclosure relates to a relay apparatus, a communication apparatus and a relay method.

An image reading apparatus for uploading an electronic file of a read image to a server is known. Also, printers for printing electronic files downloaded from servers are known. In order to provide these services, makers of image reading apparatuses or printers may provide dedicated servers on their own.

Meanwhile, web services capable of storing electronic files in databases prepared on a network by service providers are in widespread use. For example, a PICASA (a registered trademark) web album and FLICKR (a registered trademark) are examples of the web services. Users can use communication apparatuses having web browsers to upload desired electronic files to service providing apparatuses for web services or download electronic files from the service providing apparatuses for web services.

Instead of providing dedicated servers, the makers of image reading apparatuses or printers may configure image reading apparatuses or printers making it possible to directly use web services through the image reading apparatuses or printers.

SUMMARY

In order to use these web services, prior to using the services, the image reading apparatuses or printers need to perform authentication with the service providing apparatuses for the web services so as to receive access permissions from the service providing apparatuses for the web services. However, since web browsers are generally used to perform the authentication with the service providing apparatuses, in apparatuses without web browsers, it is difficult to receive access permissions.

An aspect of the present disclosure was made to solve the problems, and an object is to provide a communication system, a relay apparatus, a communication apparatus, a relay method, and a communication method enabling the communication apparatus to acquire permission information issued by a service providing apparatus even when the communication apparatus has no web browser.

The aspect of the disclosure provides the following arrangements.

A relay apparatus is configured to be connected through a network to a communication apparatus, a service providing apparatus and a browser-equipped apparatus. The service providing apparatus is configured to provide a service while the browser-equipped apparatus is configured with a browser to manage information provided by the service providing apparatus. The relay apparatus includes: (1) a registering unit; (2) a permission-information acquiring unit; (3) a provisional-registration-information communication unit; (4) an input-information receiving unit; and (5) a permission-information communication unit. The registering unit is configured to register provisional registration information that is used in an authentication procedure performed between the service providing apparatus and the browser-equipped apparatus. The authentication procedure enables the relay apparatus to use the service provided by the service providing apparatus. The permission-information acquiring unit is configured to acquire permission information representing that use of the service is permitted; the permission information is issued by the service providing apparatus in the authentication procedure. The input-information receiving unit is configured to receive input information that is transmitted from the communication apparatus with the input information being generated in response to the provisional registration information output by the browser equipped apparatus. The permission-information communication unit is configured to transmit the permission information to the communication apparatus if the communication apparatus has transmitted input information to the input-information receiving unit and the input-information receiving unit has received the input information. The permission information acquired by the permission information acquiring unit is acquired in the authentication procedure of registering the provisional registration information that corresponds to the input information received by the input information receiving unit.

A relay method is configured to be executed in a relay apparatus. The relay apparatus is configured to be connected, through a network, to a communication apparatus, a service providing apparatus and a browser-equipped apparatus. The service providing apparatus is configured to provide a service. The browser-equipped apparatus is configured with a browser for managing information provided by the service providing apparatus. The relay method includes: (1) registering provisional registration information in a register unit; (2) acquiring permission information representing that use of the service is permitted; (3) transmitting the provisional registration information registered in the register unit from the relay apparatus to the browser-equipped apparatus; (4) receiving input information transmitted from the communication apparatus; and (5) transmitting permission information to the communication apparatus if the communication has transmitted input information and the input information has been received. The provisional registration information is used in an authentication procedure performed between the service providing apparatus and the browser-equipped apparatus for enabling the relay apparatus to use the service provided by the service providing apparatus. The permission information is issued by the service providing apparatus in the authentication procedure. The input information is generated in response to the provisional registration information output by the browser-equipped apparatus. The permission information is acquired in the authentication procedure of registering the provisional registration information corresponding to the received input information.

A communication apparatus is configured to be connected through a network to a relay apparatus, a service providing apparatus, and a browser-equipped apparatus. The service providing apparatus is for providing a service. The browser-equipped apparatus has a browser for managing information provided by the service providing apparatus. The communication apparatus includes: (1) a receiving unit; (2) an input-information transmitting unit; (3) an information requesting unit; (4) an information acquiring unit; and (5) a communication unit. The receiving unit is configured to receive input information according to provisional registration information registered in the relay apparatus. The provisional registration information is used in an authentication procedure performed between the service providing apparatus and the browser-equipped apparatus for enabling the relay apparatus to use the service provided by the service providing apparatus. The input-information transmitting unit is configured to transmit the input information, received by the receiving unit, to the relay apparatus. The information requesting unit is configured to request permission information from the relay apparatus to acquire the permission information. The permission information represents that use of the service is permitted and is issued by the service providing apparatus in the authentication procedure in which the provisional registration information corresponding to the input information transmitted by the input-information transmitting unit is registered. The information acquiring unit is configured to acquire the permission information, acquired by the relay apparatus in response to the request of the information requesting unit, from the relay apparatus. The communication unit is configured to perform communication between the communication apparatus and the service providing apparatus. The communication unit may also provide the request to the relay apparatus to communicate with the service providing apparatus, on the basis of the permission information acquired by the information acquiring unit.

BRIEF DESCRIPTION OF DRAWINGS

FIG. 2A is a view illustrating an example of a structure of a registration information database (DB).

FIG. 2B is a view illustrating an example of a structure of a provisional registration information DB.

DESCRIPTION OF EXEMPLARY EMBODIMENTS

Figure 1:
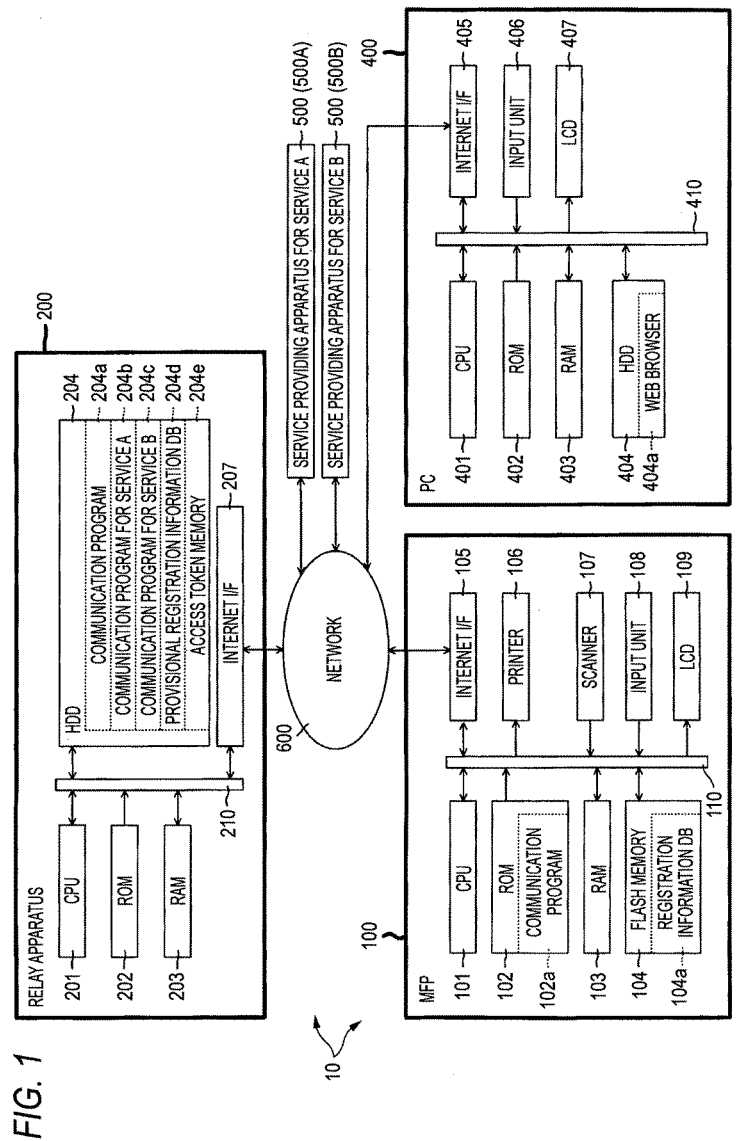
FIG. 1 is a block diagram schematically illustrating an electrical configuration of a service cooperation system according to an embodiment.

Hereinafter, an exemplary embodiment will be described with reference to the accompanying drawings. A service cooperation system 10 includes a multi-function device 100 (hereinafter, referred to as a multi-function printer, or the MFP 100) and a relay apparatus 200. The MFP 100 is a combined device having a print function, a scanner function, a fax function, and a copy function. The relay apparatus 200 is a server provided by a maker of the MFP 100. A PC 400 is a personal computer owned by a user of the MFP 100. A service providing apparatus 500 is a web server provided by a service provider.

In order to access the service providing apparatus 500 to use an application programming interface (API) provided by the service provider, it is necessary to first acquire an access token issued by the service providing apparatus 500. The service cooperation system 10 of the present embodiment is configured to acquire this access token even when the MFP 100 does not have web browser functionality. This will be described below in detail.

The MFP 100, the relay apparatus 200, the PC 400, and the service providing apparatus 500 are connected to one another through a network 600, and perform data transmission and reception with one another in accordance with the hypertext transport protocol (HTTP). The network 600 may comprise an Ethernet network. Also, in the present embodiment, it is assumed that a plurality of service providing apparatuses 500 for providing different services (for example, a service A and a service B) exist in the network 600. An apparatus for providing the service A is referred to as a service providing apparatus 500A, and an apparatus for providing the service B is referred to as a service providing apparatus 500B.

The MFP 100 mainly includes a central processing unit (CPU) 101, a read-only memory (ROM) 102, a random access memory (RAM) 103, a flash memory 104, an internet interface (I/F) 105, a printer 106, a scanner 107, an input unit 108, and a liquid crystal device (LCD) 109, which are connected to one another through bus lines 110.

The CPU 101 executes processes in accordance with programs stored in a ROM 102. The ROM 102 is a memory for storing programs and the like for controlling an operation of the MFP 100, and stores a communication program 102a. The communication program 102a is a program for performing data transmission and reception according to HTTP, and acts as an XML parser for interpreting XML. The XML parser is configured to interpret extensible markup language with common methods known in the art for interpreting such extensible markup language. However, the communication program 102a does not act as an HTML parser for interpreting hypertext markup language (HTML). Therefore, the MFP 100 cannot interpret information written in HTML and, as such, the MFP cannot display web pages provided by the service providing apparatus 500.

The RAM 103 temporarily stores information necessary for the processes of the CPU 101. The flash memory 104 is a non-volatile memory, and stores a registration information database (DB) 104a. The registration information DB 104a will be described below with reference to FIG. 2A. The internet I/F 105 is a device for performing communication with other apparatuses through the network 600, and a known network card can be used as the internet I/F 105. The printer 106 is a device for printing images, and the scanner 107 is a device for reading images. The input unit 108 includes manipulation keys and a touch panel for inputting instructions or information to the MFP 100. The LCD 109 displays various kinds of information. The touch panel is superimposed on a display surface of the LCD 109.

The relay apparatus 200 mainly includes a CPU 201, a ROM 202, a RAM 203, a hard disk drive (HDD) 204, and an internet I/F 207, which are connected to one another through bus lines 210.

The CPU 201 executes processes in accordance with programs stored in the ROM 202 or the HDD 204. The ROM 202 stores programs and the like for controlling an operation of the relay apparatus 200. The RAM 203 temporarily stores data necessary for the processes of the CPU 201.

The HDD 204 is a rewritable non-volatile storage device. A communication program 204a, a communication program 204b for the service A, a communication program 204c for the service B, and a provisional registration information database 204d (provisional registration information DB 204d) are stored at a predetermined memory area of the HDD 204. Also, the HDD 204 includes an access token memory 204e. The communication program 204a is a program for performing data transmission and reception according to HTTP, and acts as an XML parser for interpreting XML. For communication between the MFP 100 and the relay apparatus 200, XML is used. The communication program 204b for the service A is a program for performing communication between the service providing apparatus 500A and the relay apparatus 200, and the communication program 204c for the service B is a program for performing communication between the service providing apparatus 500B and the relay apparatus 200. In accordance with the communication program 204b for the service A, an HTTP message using an API provided by the service provider of the service A is generated, and in accordance with the communication program 204c for the service B, an HTTP message using an API provided by the service provider of the service B is generated.

The provisional registration information DB 204d will be described below with reference to FIG. 2B. The access token memory 204e is a memory for storing an access token which the relay apparatus 200 receives from the service providing apparatus 500. The internet I/F 207 is a device for enabling the relay apparatus 200 to perform communication with other apparatuses connected to the network 600.

The PC 400 includes a CPU 401, a ROM 402, a RAM 403, a hard disk drive (HDD) 404, an internet interface (I/F) 405, an input unit 406, an LCD 407, and so on, which are connected to one another by bus lines 410. In the HDD 404, a web browser 404a is installed and stored, and web pages provided by various web servers such as the service providing apparatus 500 can be displayed on the LCD 407 by the web browser 404a.

As shown in FIG. 2A, information constituting the registration information DB 104a includes a service ID, an account name, a password, and an access token. The service ID, the account name, the password, and the access token are stored in association with one another. The service ID is information for identifying a service which the MFP 100 can use through the network. The account name associated with the service ID is identification information on a user having the right to log in to the service identified by the service ID. The password is a character string used in combination with the account name when the user logs in to the service identified by the service ID. The access token is a character string of 9 digits or more issued from a service providing apparatus for the service identified by the service ID, and is information for representing that use of the corresponding service is permitted. Various kinds of information of the registration information DB 104a are set in step U415 shown in FIG. 4, which will be described below in detail with reference to FIG. 4.

When the MFP 100 communicates with the service providing apparatus 500 or when the MFP 100 requests the relay apparatus 200 to execute communication with the service providing apparatus 500, the MFP 100 uses signature information (to be described below) generated on the basis of the access token. How the MFP 100 uses the signature information generated on the basis of the access token will be described below with reference to FIG. 6. Also, how the MFP 100 acquires the access token will be described below with reference to FIG. 4.

As shown in FIG. 2B, information constituting the provisional registration information DB 204d includes a provisional registration ID, an authentication token, and a service ID. The provisional registration ID, the authentication token, and the service ID are stored in association with one another.

The provisional registration ID is an 8-digit random number generated in the relay apparatus 200. Meanwhile, the authentication token may be a character string of 9 digits or more using numbers and letters, and is information issued by the service providing apparatus 500. As shown in FIG. 2B, one authentication token is associated with one provisional registration ID. Also, in order to identify the service provided by the service providing apparatus having issued the authentication token, the authentication token is stored in association with the service ID of the service which the service providing apparatus having issued the authentication token provides.

Prior to start of this process, the PC 400 performs a process of registering the account name for identifying the user and the password in the service providing apparatus 500, in accordance with an input of the user, and the registered account name and password are stored in the service providing apparatus 500 in association with each other.

The PC 400 performs an authentication procedure in accordance with an input of the user. The authentication procedure is a procedure for permitting access to the service providing apparatus 500 using the API provided by the service provider and use of the service provided by the service providing apparatus 500. Specifically, the authentication procedure is a procedure for permitting the relay apparatus 200 to use resources which the service providing apparatus 500 manages under the account name of the user. In user manipulation and communication processes of steps U301 to U319 shown in FIG. 3, the authentication procedure between the PC 400 and the service providing apparatus 500 is performed in order according to an open standard for authorization (OAuth) which is an example of a protocol for permitting use of an API.

First, the PC 400 receives an input of the user to request display of a service selection screen. Then, in step U301, the PC 400 requests the service selection screen from the relay apparatus 200. In step U302, the relay apparatus 200 transmits the service selection screen composed of a web page, to the PC 400. The PC 400 displays the received service selection screen on the LCD 407 by the function of the web browser 404a. The service selection screen is a screen for enabling the user to select any one from services provided through the network, and is composed of HTML data.

Next, in step U303, the PC 400 transmits a request for provisional registration to the service, selected from the services displayed as selection items on the service selection screen by the user, to the relay apparatus 200. Here, in order to make the description understandable, it is assumed that one service is selected by the user. If the provisional registration request is received, in step U304, the relay apparatus 200 transmits a request for acquiring a request token and a URL of the relay apparatus 200 to the service providing apparatus 500 providing the selected service. The URL of the relay apparatus 200 is stored in the HDD 204 of the relay apparatus 200. In response to the request for acquiring the request token, the service providing apparatus 500 issues the request token, and stores the request token and the URL of the relay apparatus 200 received from the relay apparatus 200 in association with each other. Then, in step U305, the service providing apparatus 500 transmits the issued request token to the relay apparatus 200.

Next, in step U306, the relay apparatus 200 transmits a command for redirecting to a login page, which the service provider of the service providing apparatus 500 provides, to the PC 400 which is the provisional registration requestor. The redirection command includes the request token that the relay apparatus 200 has received from the service providing apparatus 500.

If the redirection command is received, the PC 400 accesses the login page for the service providing apparatus 500, and transmits the request token received from the relay apparatus 200, to the service providing apparatus 500 in step U307. In step U308, the service providing apparatus 500 transmits the login page to the PC 400 which is the request token transmitter. This login page is a web page including input boxes for an account name and a password.

If the user inputs the account name and the password, registered in the service providing apparatus 500, in the login page displayed in the PC 400 in step U309, the PC 400 transmits the account name and the password to the service providing apparatus 500 in step U310. Then, the service providing apparatus 500 checks whether the account name and the password correspond to the combination of the account name and the password stored in the service providing apparatus 500. If it is determined that the account name and the password correspond to the combination of the account name and the password stored in the service providing apparatus 500, the service providing apparatus 500 transmits a permission confirmation page to the PC 400 in step U311. The permission confirmation page is a web page for inquiring of the user about whether to permit the relay apparatus 200 to use the resources which the service providing apparatus 500 manages under the input account name. Meanwhile, if it is determined that the account name and the password do not correspond to the combination of the account name and the password stored in the service providing apparatus 500, the service providing apparatus 500 requests input of another account name and password until the input account name and password correspond to the combination of the account name and the password.

If the user accepts use of the service providing apparatus 500 by the relay apparatus 200 in the permission confirmation page in step U312, the PC 400 transmits an acceptance notification to the service providing apparatus 500 in step U313. Thereby, the authentication procedure between the PC 400 and the service providing apparatus 500 is completed. That is, the relay apparatus 200 is permitted to access the service providing apparatus 500 and use the service provided by the service providing apparatus 500. Specifically, the relay apparatus 200 is permitted to access data of the user, identified by the account name and the password input in step U309, among data stored in the service providing apparatus 500. In steps U308, U310, U311, and U313, the PC 400 or the service providing apparatus 500 transmits the request token, issued in step U305, with various kinds of information such as the login page. In this way, the request token stored in the service providing apparatus 500 in association with the URL of the relay apparatus 200 is transmitted and received between the PC 400 and the service providing apparatus 500. Therefore, the service providing apparatus 500 can identify the relay apparatus 200 permitted to access the service providing apparatus 500 by the authentication procedure.

Meanwhile, if the user rejects use of the service providing apparatus 500 by the relay apparatus 200 in the permission confirmation page in step U312, the PC 400 transmits a rejection notification to the service providing apparatus 500. Thereby, the authentication procedure between the PC 400 and the service providing apparatus 500 stops.

Next, in step U314, the service providing apparatus 500 transmits a command for redirecting to the relay apparatus 200, to the PC 400. This redirection command includes the authentication token issued by the service providing apparatus 500 and the URL of the relay apparatus 200. The authentication token is information representing that the authentication procedure has been performed between the service providing apparatus 500 and the PC 400. The service providing apparatus 500 stores the URL of the relay apparatus 200 and the authentication token in association with each other.

Where the redirection command is received from the service providing apparatus 500, the PC 400 accesses the relay apparatus 200 and transmits a request for issuing the provisional registration ID in step U315. Since the redirection command includes the URL of the relay apparatus 200, the PC 400 can identify the relay apparatus 200 permitted to access the service providing apparatus 500 by the authentication procedure. The request for issuing the provisional registration ID includes the authentication token which the PC 400 has received from the service providing apparatus 500.

Where the authentication token is received from the PC 400, the relay apparatus 200 can determine that the authentication procedure has been performed between the PC 400 and the service providing apparatus 500. Then, the relay apparatus 200 generates the provisional registration ID in step U316, and registers the provisional registration ID, in association with the authentication token received from the PC 400 and the service ID of the service which the service providing apparatus having issued the authentication token provides, as information included in the provisional registration information DB 204d in step U317.

Next, in step U318, the relay apparatus 200 transmits the provisional registration ID registered in the provisional registration information DB 204d, to the PC 400. Then, in step U319, the PC 400 displays the received provisional registration ID on the LCD 407 by the web browser 404a so as to inform the user of the provisional registration ID. The user uses the provisional registration ID to perform work required for registering the access token (see FIG. 4) in the MFP 100.

Figure 4:
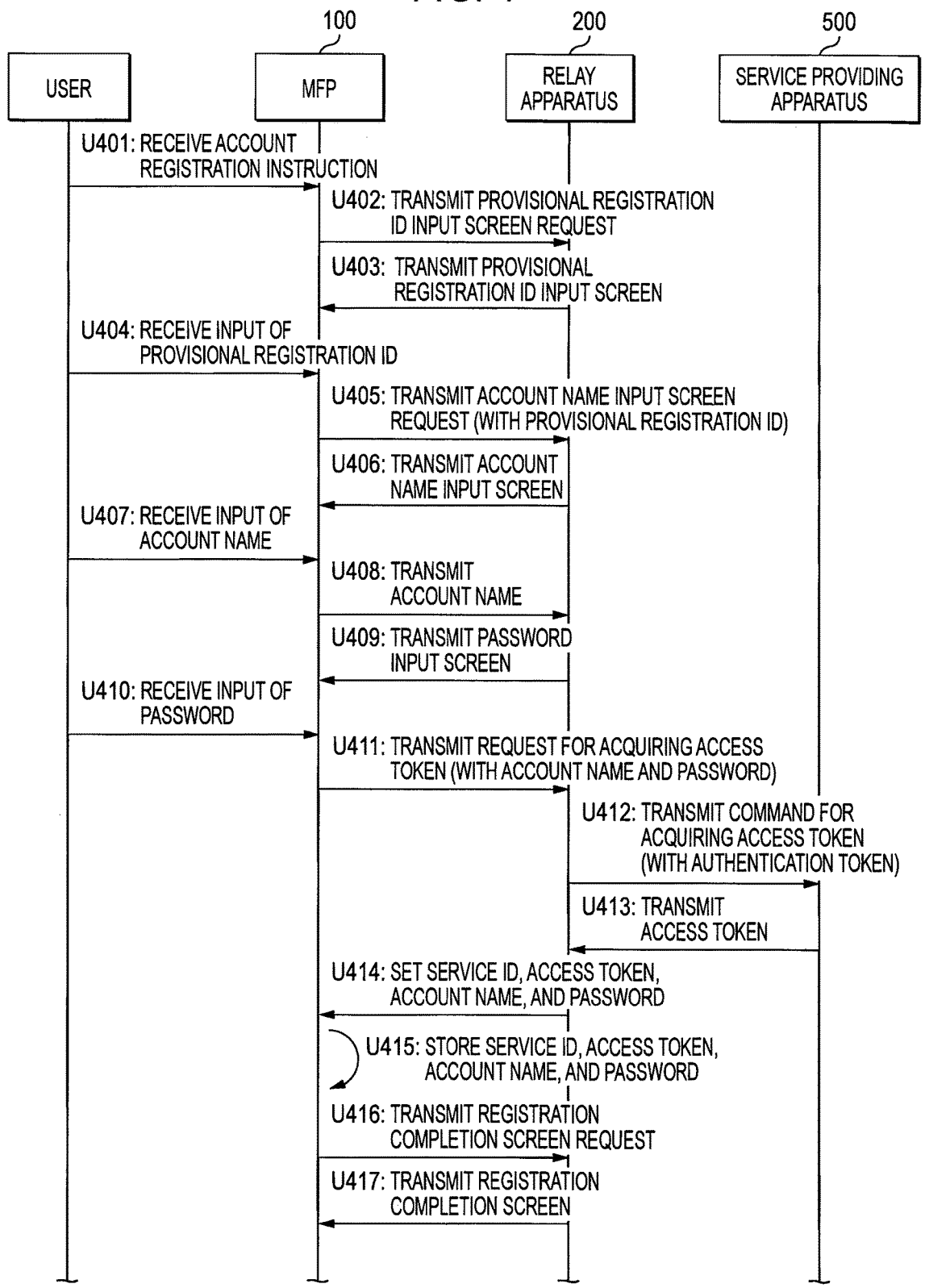
FIG. 4 is a sequence diagram illustrating an information flow among a multi-function peripheral (MFP) device, the relay apparatus, and the service providing apparatus.

FIG. 4 is a sequence diagram illustrating an information flow among the MFP 100, the relay apparatus 200, and the service providing apparatus 500, and is a view illustrating a process flow after the provisional registration ID is displayed on the LCD 407 of the PC 400. First, in step U401, the user inputs an account registration instruction to the MFP 100.

If the user inputs the account registration instruction, then in step U402, the MFP 100 requests a provisional registration ID input screen from the relay apparatus 200. In step U403, the relay apparatus 200 generates UI display data for drawing the provisional registration ID input screen in the MFP 100, and transmits the UI display data with a command for instructing a screen display to the MFP 100. In the present embodiment, the UI display data is data structured in a unique data format for the maker of the MFP 100 according to XML, and is included in the communication program 204a.

If an instruction input to start the registration work for using the service is received, as selected by the user, in the MFP 100, by an input of the user, the MFP 100 displays a setting start screen 109a (shown in FIG. 5) on the LCD 109.

In the setting start screen 109a, an OK-key input of the user corresponds to the account registration instruction (of step U401). If the MFP 100 receives an OK-key input from the user in the setting start screen 109a, in step U402, the MFP 100 requests the provisional registration ID input screen from the relay apparatus 200. This provisional registration ID input screen request includes the service ID of the service selected by the user. Next, the MFP 100 displays the provisional registration ID input screen 109b on the basis of the UI display data received from the relay apparatus 200, and receives an input of the provisional registration ID. Since the relay apparatus 200 informs the PC 400 of the provisional registration ID as described above, the user may memorize and hold in their memory the provisional registration ID displayed on the LCD 407 of the PC 400. Therefore, the user can input the provisional registration ID in the provisional registration ID input screen 109b displayed in the MFP 100 while referring to the memorized provisional registration ID.

Referring to FIG. 4 again, if the user inputs the provisional registration ID in the provisional registration ID input screen 109b in step U404, the MFP 100 transmits an account name input screen request to the relay apparatus 200 in step U405. This account name input screen request includes the provisional registration ID received in the provisional registration ID input screen 109b. The relay apparatus 200 determines whether the provisional registration ID received from the MFP 100 corresponds to the provisional registration ID registered in the provisional registration information DB 204d in association with the service ID included in the provisional registration ID input screen request. If it is determined that the provisional registration ID received from the MFP 100 corresponds to the provisional registration ID registered in the provisional registration information DB 204d, in step U406, the relay apparatus 200 generates UI display data for drawing an account name input screen on the MFP 100, and then transmits this UI display data along with a command to enable a screen display that is drawn in accordance with the UI display data to the MFP 100. If it is determined that the provisional registration ID received from the MFP 100 does not correspond to the provisional registration ID registered in the provisional registration information DB 204d, the relay apparatus 200 requests an input of another provisional registration ID until the input provisional registration ID corresponds to the provisional registration ID registered in the provisional registration information DB 204d.

Figure 5:
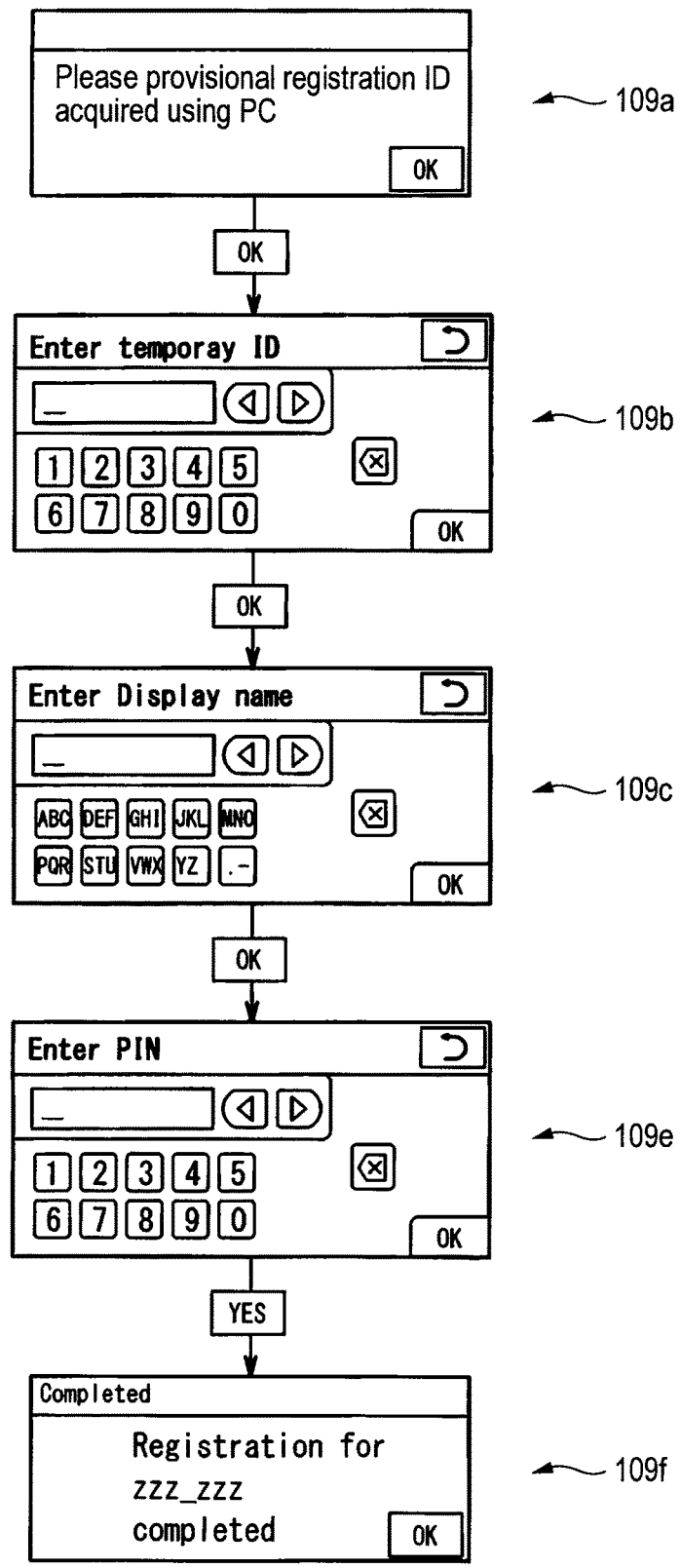
FIG. 5 is a view illustrating screen transitions in the multi-function device.

Referring to FIG. 5, the MFP 100 displays an account name input screen 109c on the basis of the UI display data received from the relay apparatus 200, and receives an input of an account name. The user inputs a desired account name to be registered, to the MFP 100 through the account name input screen 109c.

Referring to FIG. 4 again, if the account name is input in step U407, in step U408, the MFP 100 transmits the input account name to the relay apparatus 200. If the account name is received from the MFP 100, the relay apparatus 200 generates UI display data for drawing a password input screen, and then transmits this UI display data along with a command to enable a screen display that is drawn in accordance with the UI display data to the MFP 100 in step U409. If this command is received at the MFP 100, the MFP 100 then transitions from the account name input screen 109c to the password input screen 109e as shown in FIG. 5, so as to urge the user to input a password. The password is a password which the user wants to be registered, with the account name input in step U407, in the MFP 100.

Referring to FIG. 4 again, if the password is input in step U410, then in step U411, the MFP 100 transmits a request for acquiring the access token to the relay apparatus 200. The request for acquiring the access token includes the account name and the password input in the MFP 100. The account name and the password input in the MFP 100 may be different from the account name and the password registered in the service providing apparatus 500. If the request for acquiring the access token is received, then in step U414, the relay apparatus 200 reads the authentication token and the service ID associated with the provisional registration ID received from the MFP 100 from the provisional registration information DB 204d, and transmits a command for acquiring the access token to the service providing apparatus 500 identified by the service ID, in step U412. The relay apparatus 200 stores the account name and the password included in the received request for acquiring the access token, in the RAM 203, in association with the provisional registration ID received in step U405. The command for acquiring the access token includes the authentication token read from the provisional registration information DB 204d by the relay apparatus 200. If the authentication token is received, then the service providing apparatus 500 determines whether the authentication token corresponds to the authentication token stored in association with the URL of the relay apparatus 200, which is the transmitter of the command for acquiring the access token. If it is determined that the authentication token included in the command for acquiring the access token corresponds to the authentication token stored in association with the URL of the relay apparatus 200, then in step U413, the service providing apparatus 500 issues the access token representing that use of the service is permitted for the transmitter of the authentication token (the relay apparatus 200 in the present embodiment).

Meanwhile, if it is determined that the authentication token included in the command for acquiring the access token does not correspond to the authentication token stored in association with the URL of the relay apparatus 200, which is the transmitter of the command for acquiring the access token, the service providing apparatus 500 transmits error information to the relay apparatus 200, which is the transmitter of the authentication token. The error information is information representing that the service providing apparatus 500 cannot issue any access token on the basis of the command for acquiring the access token.

If the access token issued by the service providing apparatus 500 is acquired by the relay apparatus 200, then in step U414, the relay apparatus 200 generates a setting/storing command for instructing the MFP 100 to set the service ID, the account name, the password, and the access token in association with one another, and transmits the setting/storing command to the MFP 100. Specifically, the setting/storing command is a command for instructing the MFP 100 to include the service ID, the account name, the password, and the access token in the registration information DB 104a in association with one another, and store the registration information DB 104a. In step U414, the relay apparatus 200 transmits the service ID, the account name, the password, and the access token with the setting/storing command to the MFP 100. After transmitting the setting/storing command to the MFP 100, the relay apparatus 200 erases the account name and the password stored in the RAM 203. Also, after transmitting the setting/storing command to the MFP 100, the relay apparatus 200 erases the authentication token included in the command for acquiring the access token as well as the provisional registration ID and the service ID registered in association with the authentication token in the provisional registration information DB 204d. Since private information, such as the password and the authentication token, of the user of the MFP 100 is erased from the relay apparatus 200 (which is accessible by a plurality of MFPs), in response to the setting/storing command transmitted to the MFP 100, it is possible to secure secrecy of the private information. If the setting/storing command is received by the MFP 100, then in step U415, the MFP 100 associates and stores the service ID, the account name, the password, and the access token in the registration information DB 104a. Next, in step U416, the MFP 100 requests a registration completion screen from the relay apparatus 200. Then, in step U417, the relay apparatus 200 generates UI display data for displaying a registration completion screen, and transmits the UI display data along with a command for enabling a screen display drawn in accordance with the UI display data to the MFP 100.

FIG. 5 shows an example of a registration completion screen 109f. As shown in FIG. 5, the registration completion screen 109f is used to inform the user of the MFP 100 that the registration work for using the desired service in the MFP 100 has been completed.

According to the service cooperation system 10, if the authentication procedure is performed between the service providing apparatus 500 and the PC 400, the provisional registration ID is transmitted from the relay apparatus 200 to the PC 400. Therefore, the user can know the provisional registration ID by the PC 400. Then, if the user inputs the provisional registration ID to the MFP 100, the provisional registration ID is transmitted from the MFP 100 to the relay apparatus 200, and the access token is transmitted from the relay apparatus 200 to the MFP 100. Therefore, according to the service cooperation system 10, even when the MFP 100 has no web browser, the MFP 100 can acquire the access token issued by the service providing apparatus 500.

Also, the user can make the PC 400 execute the authentication procedure by the input of the user, and then make the MFP 100 acquire the access token by simply inputting the provisional registration ID to the corresponding MFP 100. Further, according to the service cooperation system 10, for example, in an environment in which the PC 400 does not have any driver, such as a printer driver, installed therein for controlling the MFP 100, the MFP 100 can acquire the access token.

Furthermore, since the relay apparatus 200 is a server provided by the maker of MFPs 100, the number of MFPs communicating with the relay apparatus 200 is smaller than the number of apparatuses using the API provided by the service providing apparatus 500. That is, since the number of apparatuses for which the relay apparatus 200 permits authentication is smaller than the number of apparatuses for which the service providing apparatus 500 permits authentication, the maker of MFPs 100 can configure the provisional registration ID used in the relay apparatus 200 for determining whether authentication is possible or not, to have an amount of information (the number of digits) smaller than the authentication token used in the server apparatus for determining whether authentication is possible or not. Since the provisional registration ID that the user should input to the MFP 100 has the amount of information smaller than that of the authentication token, it is possible to reduce a work load on the user, as compared to a case where the authentication token is input.

Figure 6:
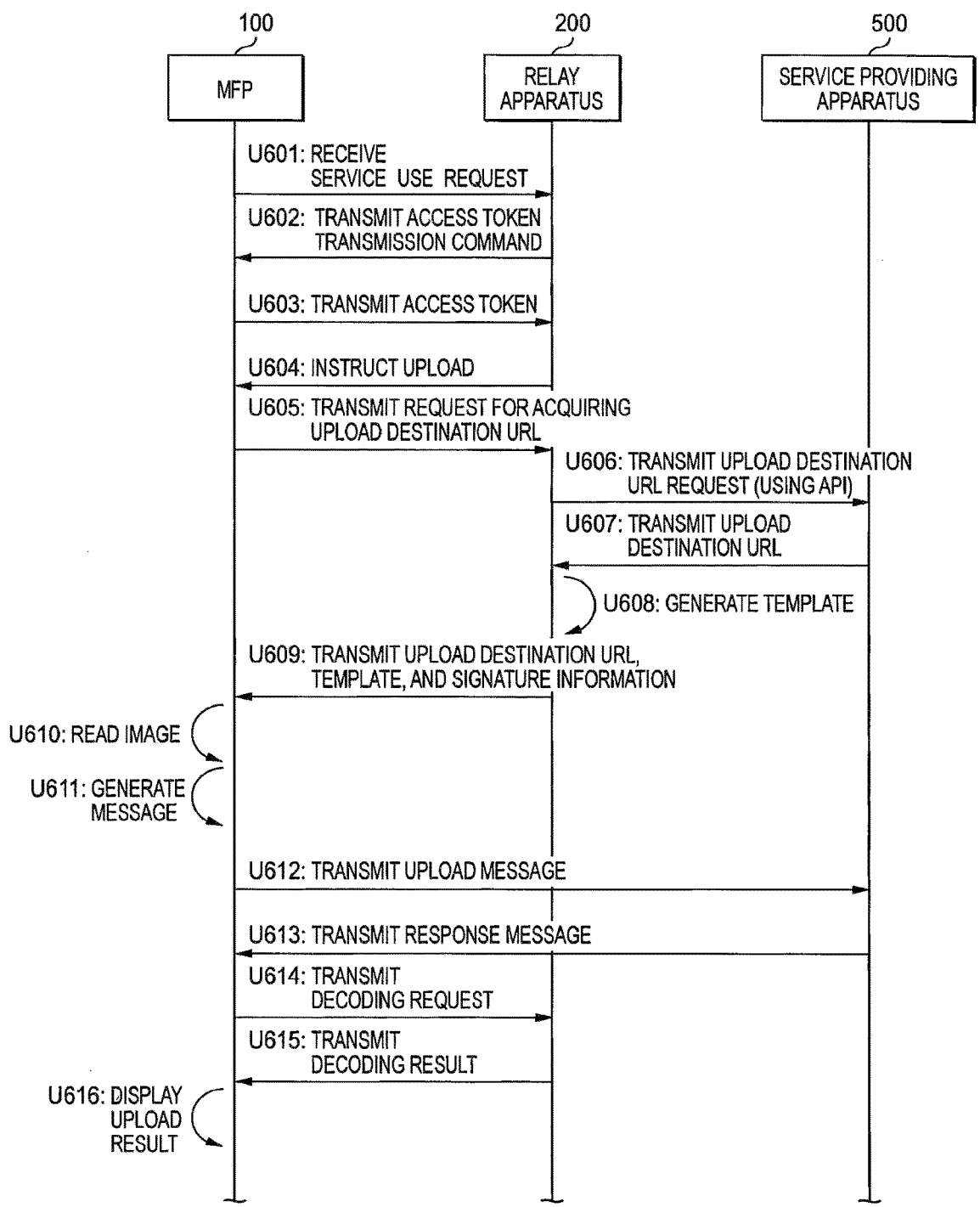
FIG. 6 is a sequence diagram illustrating an information flow among the multi-function device, the relay apparatus, and the service providing apparatus after the multi-function device acquires an access token.

FIG. 6 is a sequence diagram illustrating an information flow among the MFP 100, the relay apparatus 200, and the service providing apparatus 500 after the MFP 100 acquires the access token. First, the user selects a service and an account name. If a password input is received, the MFP 100 determines whether the input password corresponds to the password registered in the registration information DB 104a in association with the service ID of the selected service and the account name. If it is determined that the input password corresponds to the password registered in the registration information DB 104a, then in step U601, the MFP 100 transmits a service use request to the relay apparatus 200. The service use request includes the service ID of the service selected by the user, and the account name and the password registered in the registration information DB 104a in association with the service ID. If it is determined that the input password does not correspond to the password registered in the registration information DB 104a, then the MFP 100 requests a password input until the input password corresponds to the password registered in the registration information DB 104a. In this example, the description will be made based on the assumption that the user selects a service in which it is possible to upload an electronic file of an image read by the scanner 107 of the MFP 100.

If the service use request is received, in step U602, the relay apparatus 200 transmits an access token transmission command to the MFP 100. After transmitting the access token, which had been received from the service providing apparatus 500, to the MFP 100, the relay apparatus 200 does not hold the access token any more. This will be described below in detail. Therefore, in a case where the relay apparatus 200 performs communication with the service providing apparatus 500 in response to a request received from the MFP 100, the relay apparatus 200 commands the MFP 100 to transmit a necessary access token. The access token transmission command includes the service ID and the account name received from the MFP 100 by the relay apparatus 200.

In step U603, the MFP 100 reads an access token registered in the registration information DB 104a in association with the service ID received from the relay apparatus 200 and the account name input in the MFP 100, and transmits the read access token to the relay apparatus 200. If the access token is received, then in step U604, the relay apparatus 200 transmits a command for instructing upload to the MFP 100.

Next, in step U605, the MFP 100 transmits a request for acquiring an upload destination URL to the relay apparatus 200. If the request for acquiring an upload destination URL is received, then in step U606, the relay apparatus 200 transmits an upload destination URL request to the service providing apparatus 500 providing the service selected by the user. Although not shown in FIG. 6, the relay apparatus 200 generates signature information using the access token received from the MFP 100 and key information of the relay apparatus 200, and transmits the request for acquiring an upload destination URL with the signature information to the service providing apparatus 500. The request for acquiring an upload destination URL is an HTTP message using an API provided by the service provider, and is generated in accordance with a program (any one of the communication program 204b for the service A and the communication program 204c for the service B in the present embodiment) corresponding to the service.

Then, if the relay apparatus 200 is authenticated on the basis of the signature information, the service providing apparatus 500 transmits an upload destination URL to the relay apparatus 200 in step U607.

Next, in step U608, the relay apparatus 200 generates a template for an upload message to be transmitted to the service providing apparatus 500. The upload message is a message for requesting upload in the service selected by the user. Specifically, the upload message is an HTTP request message. Upload messages have different kinds of information input in headers, different kinds of information input in request bodies, and different amounts of information for each service. The relay apparatus 200 generates a template according to each service, using the program, such as the communication program 204b for the service A or the communication program 204c for the service B, corresponding to the service selected by the user.

In step U609, the relay apparatus 200 transmits the upload destination URL received from the service providing apparatus 500, the generated template, and the signature information that was authenticated by the service providing apparatus 500 to the MFP 100. If the upload destination URL, the template, and the signature information are received, the MFP 100 reads an image in step U610, and generates an electronic file of the read image. Then, the MFP 100 stores the binary data of the electronic file at a predetermined position of the template acquired from the relay apparatus 200, and generates an upload message in step U611.

After generating the upload message, next, in step U612, the MFP 100 transmits the upload message to the service providing apparatus 500 for the service selected by the user. At this time, the MFP 100 transmits the signature information received from the relay apparatus 200, together with the upload message.

If the upload message is received, in step U613, the service providing apparatus 500 transmits a response message representing an upload result to the MFP 100. Then, in step U614, the MFP 100 transmits a decoding request to the relay apparatus 200 for making the relay apparatus 200 decode the response message. If the decoding request is received, then in step U615, the relay apparatus 200 generates a result of decoding of the response message, and transmits the generated decoding result to the MFP 100. Next, in step U616, the MFP 100 displays the upload result included in the received decoding result on the LCD 109.

As described above, the MFP 100 can use the access token received from the relay apparatus 200 so as to request the relay apparatus 200 to execute communication with the service providing apparatus 500. Also, the MFP 100 can transmit the access token to the relay apparatus 200, and perform direct communication with the service providing apparatus 500 using the signature information generated on the basis of the access token by the relay apparatus 200.

Further, the MFP 100 can use the service without installing a web browser 404a or a program corresponding to the service (for example, the communication program 204b for the service A or the communication program 204c for the service B). Accordingly, the MFP 100 does not require high process performance as compared to a case where a program corresponding to the service is installed. Therefore, it is possible to reduce the manufacturing cost of the MFP 100.

Furthermore, since the account name and the access token are stored in the flash memory 104 of the MFP 100, not in the relay apparatus 200, a load on the relay apparatus 200 can be reduced, and the operational cost of the relay apparatus 200 or the equipment investment cost for the relay apparatus 200 can be reduced. In other words, since an account name and an access token are stored in each MFP 100, even when a plurality of MFPs 100 capable of using the service through the relay apparatus 200 exist, it is possible to reduce flocking to the database of the relay apparatus 200. As the number of MFPs 100 increases, in order to distribute the load on the relay apparatus 200, a plurality of relay apparatuses 200 may be provided. In this case, if account names and access tokens are stored in a database on the relay apparatus 200 side and the plurality of the relay apparatuses 200 use one database, exclusive control for simultaneous access or maintenance and management of the massive database is required. However, according to the present embodiment, since an account name and an access token are stored in each MFP 100, it is possible to easily build a load distribution environment in which a plurality of relay apparatuses 200 are arranged. Further, since the relay apparatus 200 just temporarily holds the private information, such as the account name, of the user, the private information is unlikely to be leaked from the relay apparatus 200.

The relay process is a process of relaying communication between the MFP 100 and the service providing apparatus 500, and is repeatedly executed during the operation of the relay apparatus 200.

Figure 7:
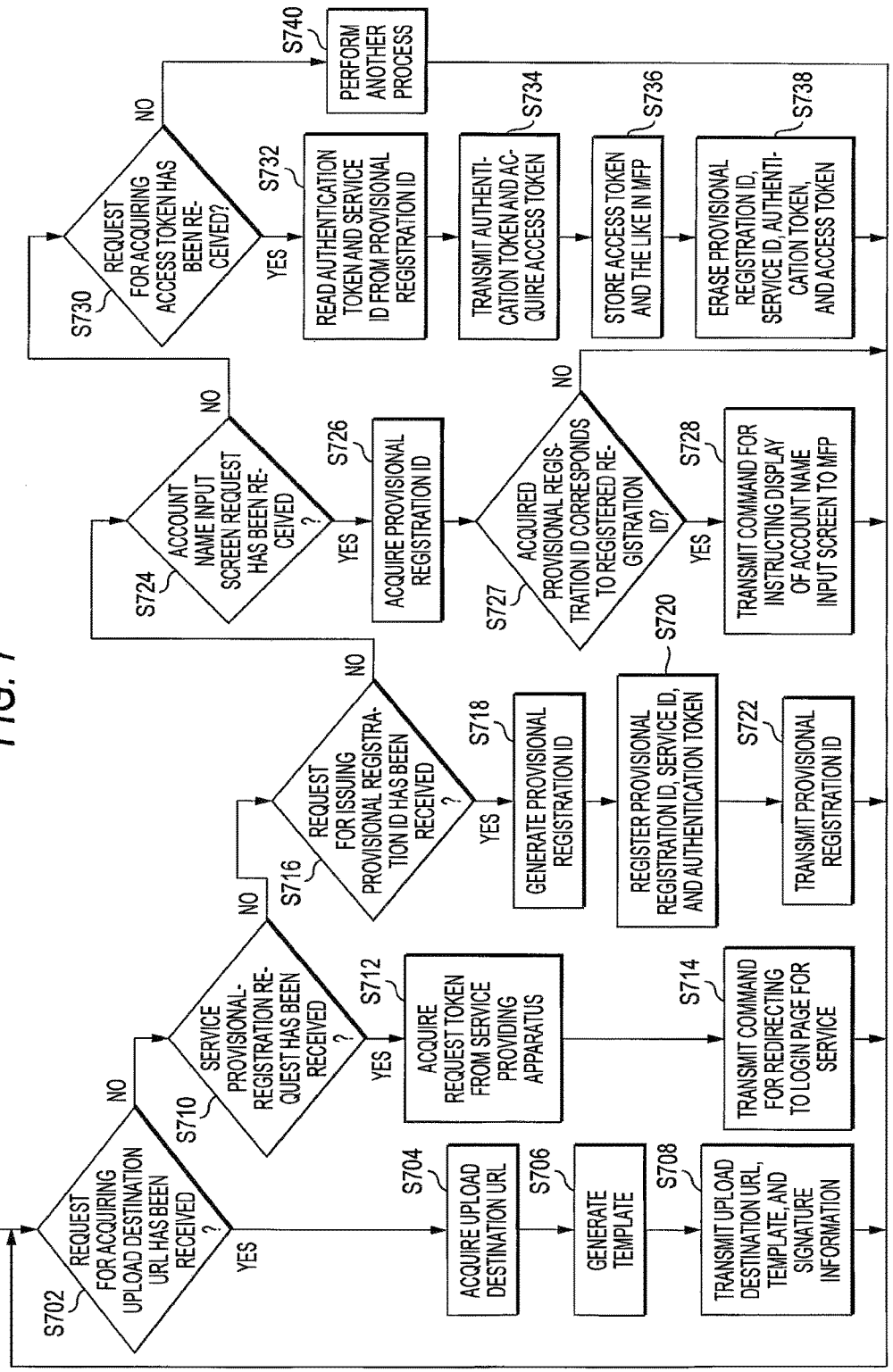
FIG. 7 is a flow chart illustrating a relay process performed in the relay apparatus.

FIG. 7 is a flow chart illustrating a relay process performed in the relay apparatus. First, in step U702, the CPU 201 determines whether a request for acquiring an upload destination URL has been received from the MFP 100. If it is determined that a request for acquiring an upload destination URL has been received (Yes in step S702), the CPU 201 requests an upload destination URL from the service providing apparatus 500, and acquires an upload destination URL in step S704. Then, in step S706, the CPU 201 generates a template for an upload message corresponding to the service selected by the user. Next, the CPU 201 transmits the upload destination URL received from the service providing apparatus 500, the template, and signature information used for acquiring the upload destination URL, to the MFP 100 in step S708, and returns to step S702.

If it is determined that any request for acquiring an upload destination URL has not been received (No in step S702), in step S710, the CPU 201 determines whether a service provisional-registration request has been received from the PC 400. If it is determined that a service provisional-registration request has been received (Yes in step S710), in step S712, the CPU 201 transmits a request for acquiring a request token to the service providing apparatus 500, and acquires a request token which the service providing apparatus issues in response to the request for acquiring a request token. Then, the CPU 201 transmits a command for redirecting to a login page for the service, to the PC 400 which is the transmitter of the service provisional-registration request, in step S714, and returns to step S702.

If it is determined in step S710 that any service provisional-registration request has not been received (No in step S710), in step S716, the CPU 201 determines whether a request for issuing a provisional registration ID has been received from the PC 400. As described above, in a case where the authentication procedure regarding use of the service providing apparatus 500 has been performed between the PC 400 and the service providing apparatus 500, the PC 400 transmits the request for issuing a provisional registration ID to the relay apparatus 200. The request for issuing a provisional registration ID includes the authentication token issued by the service providing apparatus 500.

If it is determined that a request for issuing a provisional registration ID has been received (Yes in step S716), since it can be determined that the authentication procedure has been performed between the service providing apparatus 500 and the PC 400, the CPU 201 generates a provisional registration ID in step S718, and registers the provisional registration ID, the service ID, and the authentication token as a set in the provisional registration information DB 204d in step S720. Next, in step S722, the CPU 201 transmits the registered provisional registration ID to the PC 400 which is the transmitter of the request for issuing a provisional registration ID. Then, the CPU 201 returns to step S702.

If it is determined in step S716 that a request for issuing a provisional registration ID has not been received (No in step S716), in step S724, the CPU 201 determines whether an account name input screen request has been received from the MFP 100. If it is determined that an account name input screen request has been received (Yes in step S724), in step S726, the CPU 201 acquires a provisional registration ID included in the account name input screen request. Next, in step S727, the CPU 201 determines whether the acquired provisional registration ID corresponds to a provisional registration ID registered in the provisional registration information DB 204*d* in association with a service ID included in the provisional registration ID input screen request (see step U402 shown in FIG. 4). If it is determined that the acquired provisional registration ID corresponds to the provisional registration ID registered in the provisional registration information DB 204*d* (Yes in step S727), in step S728, the CPU 201 transmits a command for instructing display of an account name input screen and UI display data to the MFP 100. Then, the CPU 201 returns to step S702. If it is determined that the provisional registration ID acquired in step S726 corresponds to the provisional registration ID registered in the provisional registration information DB 204*d* (No in step S727), the CPU 201 returns to step S702.

If it is determined in step S724 that an account name input screen request has not been received (No in step S724), in step S730, the CPU 201 determines whether a request for acquiring an access token has been received from the MFP 100. If it is determined that a request for acquiring an access token has been received (Yes in step S730), in step S732, the CPU 201 reads an authentication token and a service ID registered in the provisional registration information DB 204*d* in association with the provisional registration ID received from the MFP 100. Then, the CPU 201 transmits the authentication token to the service providing apparatus 500 identified by the acquired service ID. If the service providing apparatus 500 receives the authentication token, in step S734, the CPU 201 acquires an access token issued by the corresponding service providing apparatus 500 and stores in the access token memory 204*e*.

Next, in step S736, the CPU 201 generates a setting/storing command for instructing the MFP 100 to store the service ID, the account name, the password, and the access token in the registration information DB 104*a* in association with one another, and transmits the setting/storing command to the MFP 100, so as to store the service ID, the account name, the password, and the access token in the MFP 100. After transmitting the access token to the MFP 100, in step S738, the CPU 201 erases the access token from the access token memory 204*e*, and erases the provisional registration ID, the authentication token, and the service ID used for acquiring the access token, from the provisional registration information DB 204*d*. Then, the CPU 201 returns to step S702.

If it is determined in step S730 that a request for acquiring an access token has not been received (No in step S730), the CPU 201 performs another process (such as a process of transmitting UI display data to the MFP 100 in response to a request from the MFP 100, a process of transmitting a decoding result to the MFP 100 in response to a decoding request from the MFP 100, and a process of transmitting an access token transmission command to the MFP 100 in response to a service use request from the MFP 100) in step S740, and returns to step S702. Since main processes of other processes executed in step S740 by the relay apparatus 200 have been described in detail with reference to the sequence diagrams of FIGS. 3, 4, and 6, a description thereof will not be made any more.

According to the relay process shown in FIG. 7, after the MFP 100 acquires the access token, the access token is erased from the relay apparatus 200. Therefore, even when a plurality of MFPs 100 using the service through the relay apparatus 200 exist, it is possible to prevent a shortage in the capacity of the HDD 204. Also, since the provisional registration ID and the authentication token are unnecessary after the access token is acquired and is erased, it is possible to suppress accumulation of unnecessary information in the HDD 204. The relay apparatus 200 may be configured to automatically erase an authentication token or an access token if a predetermined time elapses after the service providing apparatus 500 or the MFP 100 acquires the authentication token or the access token. Even in this case, it is possible to reduce accumulation of unnecessary information in the HDD 204.

Figure 8:
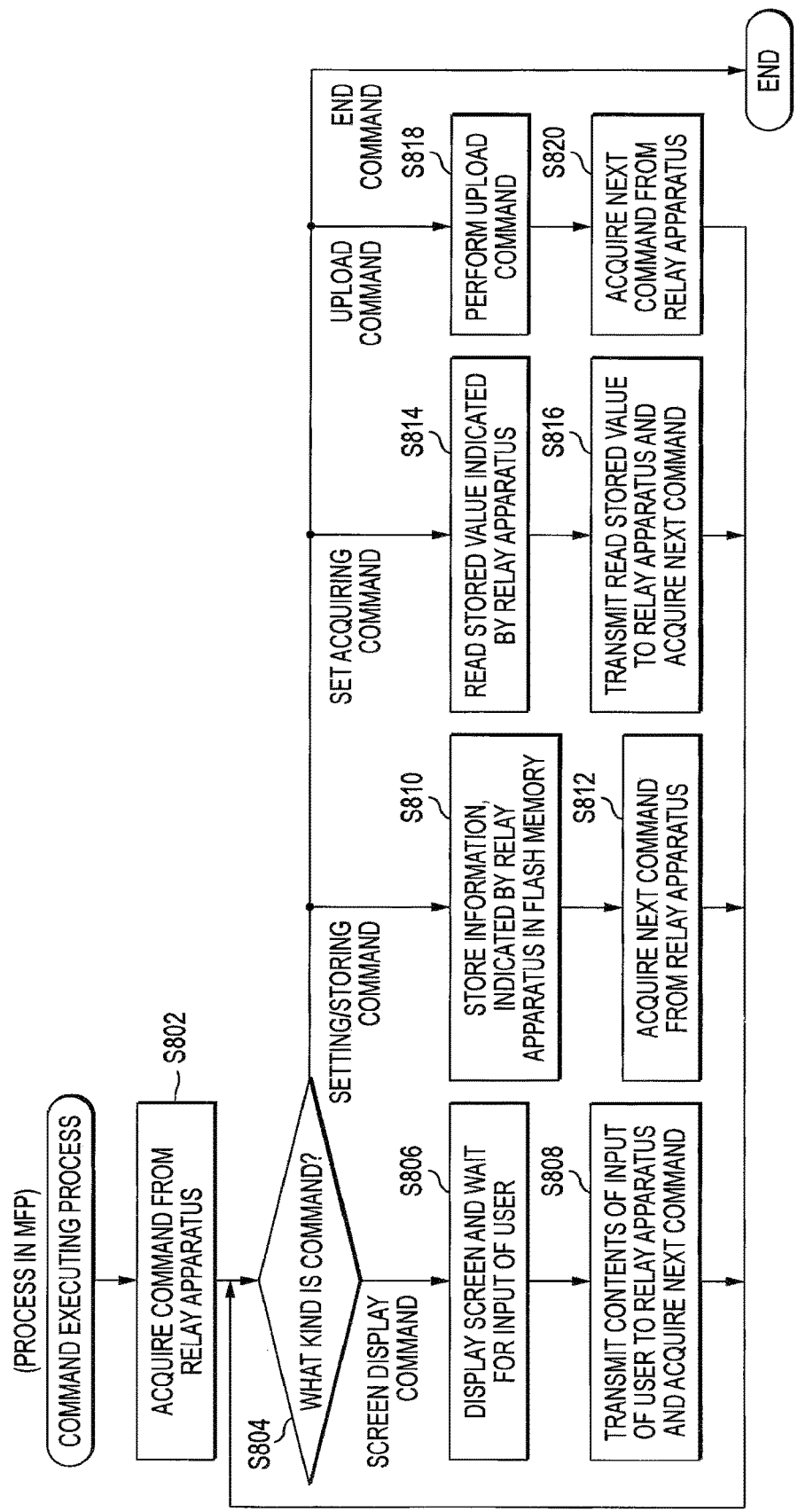
FIG. 8 is a flow chart illustrating a command executing process performed in the multi-function device.

A command executing process shown in a flow chart of FIG. 8 is repeatedly executed after the MFP 100 is powered up, and is for executing a process according to commands received from the relay apparatus 200.

First, the CPU 101 acquires a command from the relay apparatus 200 in step S802, and determines the type of command in step S804. If it is determined that the command is a screen display command (screen display command in step S804), in step S806, the CPU 101 displays a screen using UI display data included in the corresponding command received from the relay apparatus 200, and waits for a manipulation of the user. Next, in step S808, the CPU 101 transmits the contents of the input of the user to the relay apparatus 200 and acquires the next command. For example, the CPU 101 may transmit a provisional registration ID input by the user to the relay apparatus 200. Then, the CPU 101 returns to step S804.

If it is determined that the command received from the relay apparatus 200 is a setting/storing command (setting/storing command in step S804), the CPU 101 maintains information indicated by the relay apparatus 200, in the flash memory 104 in step S810, and acquires the next command in step S812. For example, the CPU 101 may store a service ID, an account name, a password, and an access token received from the relay apparatus 200, in the registration information DB 104*a* in association with one another. Then, the CPU 101 returns to step S804.

If it is determined that the command received from the relay apparatus 200 is a set acquiring command (set acquiring command in step S804), the CPU 101 reads a stored value indicated by the relay apparatus 200, from the flash memory 104 in step S814, and transmits the read stored value to the relay apparatus 200 and acquires the next command in step S816. For example, the CPU 101 may read an access token stored in the registration information DB 104*a* in association with a service ID and an account name indicated by the relay apparatus 200, and transmit the access token to the relay apparatus 200. In the present embodiment, the CPU 101 determines an access token transmission command (see step U602 shown in FIG. 6) received from the relay apparatus 200 as the set acquiring command.

If the command received from the relay apparatus 200 is an upload command (upload command in step S804), in step S818, the CPU 101 performs an upload process. This upload process has been described with reference to FIG. 6, and thus the redundant description will not be repeated here. Next, the CPU 101 acquires the next command from the relay apparatus 200 in step S820, and returns to step S804.

Meanwhile, if the command received from the relay apparatus 200 is an end command (end command in step S804), the CPU 101 ends the relay process.

In the embodiment, the service cooperation system 10 is an example of a communication system, the MFP 100 is an example of a communication apparatus, and the PC 400 is an example of a browser-equipped apparatus. The provisional registration ID is an example of provisional registration information, the authentication token is an example of authentication information, and the access token is an example of permission information. The memory area of the flash memory 104 where the registration information DB 104a is stored is an example of a second storage unit, the memory area of the HDD 204 where the provisional registration information DB 204d is stored is an example of a registration unit, and the access token memory 204e is an example of a first storage unit. The provisional registration ID input in step U414 shown in FIG. 4 is an example of input information. The processes of steps U609 to U613 shown in FIG. 6 are an example of a procedure of executing communication between the communication apparatus and a service providing apparatus on the basis of permission information, and the processes of steps U605 to U607 shown in FIG. 6 are an example of a procedure in which the communication apparatus requests a relay apparatus to communicate with the service providing apparatus on the basis of the permission information.

In the MFP 100, the CPU 101 executing step S806 and the process operation in step S806 are examples of a receiving unit and a receiving step, and the CPU 101 executing step S808 is an example of a second communication unit or an input-information transmitting unit, and the process operation in step 808 is an example of a second communication step. The CPU 101 executing step S810 is an example of a storage unit. The CPU 101 executing step S816 is an example of an information acquiring unit. The CPU 101 executing step S818 is an example of a fourth communication unit or a communication unit, and the process operation in step S818 is an example of a fourth communication step. The CPU 101 executing step U411 shown in FIG. 4 is an example of an information requesting unit.

In the relay apparatus 200, the CPU 201 executing step S718 is an example of a generating unit. The CPU 201 executing step S720 and the process operation in step S720 are examples of a registering unit and a registering step. The CPU 201 executing step S722 is an example of a first communication unit or a provisional-registration-information communication unit, and the process operation in step S722 is an example of a first communication step or a provisional-registration-information communication step. The CPU 201 executing step S724 and the process operation in step S724 are examples of an input-information receiving unit and an input-information receiving step. The CPU 201 executing step S734 is an example of an authentication token transmitting unit or a permission-information acquiring unit, and the process operation in step S734 is an example of a permission-information acquiring step. The CPU 201 executing step S736 is an example of a third communication unit or a permission-information communication unit, and the process operation in step S736 is an example of a permission-information communication step or a third communication step. The CPU 201 executing step S738 is an example of an erasing unit.

Although the present invention has been described on the basis of the embodiment, it is easily inferable that the present invention is not limited to the above-mentioned embodiment, but may be variously modified for improvement without departing from the scope of the invention.

For example, in the embodiment, the MFP 100 is an example of the communication apparatus. However, various apparatuses such as a portable phone and a digital camera may be examples of the communication apparatus. Also, in the embodiment, the relay apparatus 200 is a physically existing server. However, the relay apparatus 200 may be a virtual machine (for example, EC2 of AMAZON (a registered trademark)) acting as a server in cooperation with a plurality of physical apparatuses. Further, in the embodiment, the relay apparatus 200 is provided by the maker of the MFP 100. However, a known rental server may be used as the relay apparatus 200. In these cases, the operational cost of the relay apparatus 200 changes according to an amount of information passing through the relay apparatus 200, and a load of processing on the relay apparatus 200. According to the service cooperation system 10 of the embodiment, since an access token is stored in each MFP 100, it is possible to reduce the load on the relay apparatus 200 and reduce the operational cost.

Figure 3:
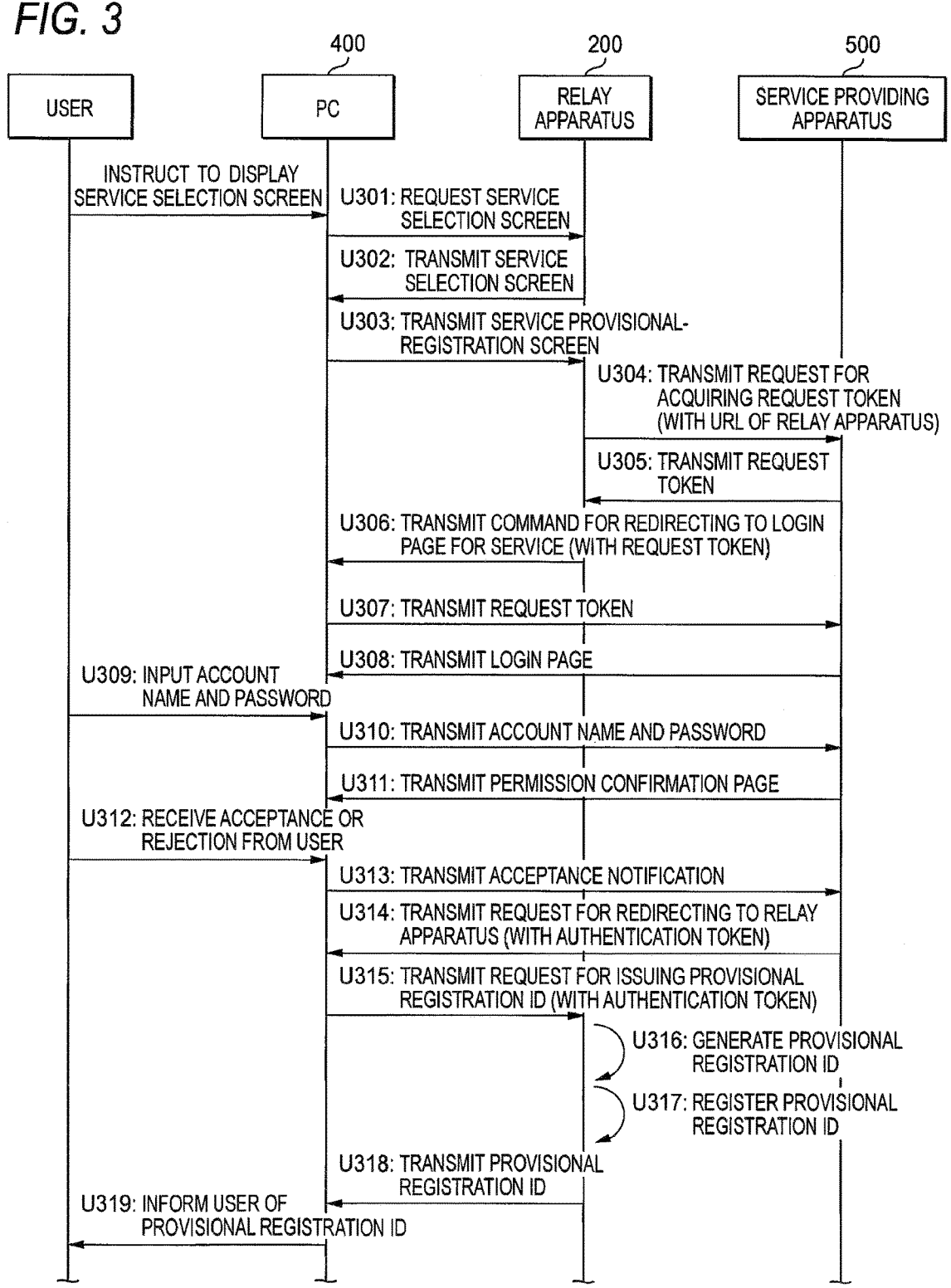
FIG. 3 is a sequence diagram illustrating an information flow among a PC, a relay apparatus, and a service providing apparatus.

In the embodiment, in steps U304 and U305 shown in FIG. 3, the relay apparatus 200 transmits the request for acquiring a request token to the service providing apparatus 500 and acquires the request token from the service providing apparatus 500. Here, the service providing apparatus 500 may perform the authentication procedure between the service providing apparatus 500 and the PC 400 without issuing any request token. In this case, if a provisional registration request is received in step U303 shown in FIG. 3, the relay apparatus 200 may skip steps U304 and U305 and transmit a command for redirecting to a login page provided by the service provider of the service providing apparatus 500, to the PC 400 which is the transmitter of the provisional registration request, in step U306. The redirection command may include a client ID capable of identifying the relay apparatus 200 and the URL of the relay apparatus 200. Next, in step U307, the service providing apparatus 500 may receive the client ID and the URL of the relay apparatus 200 from the PC 400 and store the received client ID and the URL of the relay apparatus 200 in association with each other. Then, in steps U308, U310, U311, and U313 shown in FIG. 3, the PC 400 or the service providing apparatus 500 may transmit the client ID, with various kinds of information such as the login page. In this way, the client ID stored in the service providing apparatus 500 in association with the URL of the relay apparatus 200 is transmitted and received between the PC 400 and the service providing apparatus 500. Therefore, even when the service providing apparatus 500 does not issue any request token, it is possible to identify the relay apparatus 200 to be permitted to access the service providing apparatus 500 by the authentication procedure.

Also, in the embodiment, in a case where the authentication procedure between the service providing apparatus 500 and the PC 400 is completed, in step U314 shown in FIG. 3, the service providing apparatus 500 issues the authentication token for the PC 400. However, in the case where the authentication procedure is not completed, the service providing apparatus 500 may issue an access token without issuing any authentication token. In this case, as an alternative to step U315 shown in FIG. 3, the PC 400 may receive a redirection command from the service providing apparatus 500, to access the relay apparatus 200, and transmit a request for issuing a provisional registration ID including the access token rather than the authentication token. Next, the relay apparatus 200 may include the access token received from the PC 400 and the provisional registration ID in the provisional registration information DB 204*d* in association with each other, and store the provisional registration information in DB 204*d*. Continuing with this alternative operation, in FIG. 4, if the relay apparatus 200 receives the provisional registration ID from the MFP 100 in step U405 and receives a request for acquiring an access token, as in step U411, the relay apparatus 200 may skip the processes of steps U412 and U413. Rather, the relay apparatus may read the previously stored access token associated with the provisional registration ID from the provisional registration information DB 204*d* and transmit the access token to the MFP 100 in accordance with step U414.

Also, if the authentication token is received in step U315 shown in FIG. 3, prior to reception of the request for acquiring an access token from the MFP 100 in step U411 shown in FIG. 4, the relay apparatus 200 may transmit the authentication token to the service providing apparatus 500 and acquire an access token in exchange for the authentication token. For example, in response to the reception of the authentication token in step U315, the relay apparatus 200 may perform processes as shown in steps U412 and U413 of FIG. 4, thereby acquiring the access token from the service providing apparatus 500. Even in this case, the relay apparatus 200 may store the access token and the provisional registration ID in the provisional registration information DB 204*d* in association with each other. In this instance, where the access token and the provisional registration ID have been stored in association with each other in the provisional registration information DB 204*d*, if the relay apparatus 200 then receives the provisional registration ID (as entered into the MFP by a user) and the request for acquiring an access token from the MFP 100, as in steps U405 and U411, the relay apparatus 200 may then skip the processes of steps U412 and 413, and instead read the stored access token and its associated provisional registration ID from the provisional registration information DB 204*d* and subsequently transmit the access token to the MFP 100, as in step U414.

In the embodiment, the service providing apparatus 500 provides the service for uploading electronic files from other apparatuses. However, the service cooperation system 10 of the embodiment is also applicable to service providing apparatuses 500 providing other services such as a service for downloading electronic files to other apparatuses.

In the embodiment, UI display data for displaying a screen in the MFP 100 is transmitted from the relay apparatus 200 to the MFP 100. The UI display data may be image data or information designating a template to be displayed from templates that the MFP 100 has.

Also, each of the provisional registration information DB 204*d* of the relay apparatus 200, the access token memory 204*e*, and the registration information DB 104*a* of the MFP 100 may be provided in an external storage device.

In the embodiment, in a case where a service use request is transmitted from the MFP 100 to the relay apparatus 200, an access token is read from the flash memory 104 of the MFP 100 and is used for communication between the MFP 100 and the service providing apparatus 500 or communication between the relay apparatus 200 and the service providing apparatus 500. However, a provisional registration ID input by the user may be stored in the flash memory 104 of the MFP 100, and the provisional registration ID may be transmitted from the MFP 100 to the relay apparatus 200 if a service use request is transmitted from the MFP 100 to the relay apparatus 200. In this case, the relay apparatus 200 may acquire an access token corresponding to the provisional registration ID received from the MFP 100 and transmit the access token to the MFP 100. Also, the relay apparatus 200 or the MFP 100 may perform communication with the service providing apparatus 500 using the access token acquired by the relay apparatus 200.

In the embodiment, the user manually inputs the provisional registration ID displayed in the PC 400, to the MFP 100. However, under an environment in which communication between the PC 400 and the MFP 100 is possible, the PC 400 may directly output the provisional registration ID received from the relay apparatus 200, to the MFP 100, and the MFP 100 may receive the provisional registration ID from the PC 400. Then, the MFP 100 may transmit the provisional registration ID directly input from the PC 400, to the relay apparatus 200.

In the embodiment, the provisional registration ID is 8-digit information. However, the present invention is not limited thereto. The provisional registration ID may be information having an amount of information smaller than that of the authentication token or the access token.

In the embodiment, the relay apparatus 200 receives an access token issued by the service providing apparatus 500 and stores the access token in the HDD 204 of the relay apparatus 200. In this way, the relay apparatus 200 acquires the access token. However, acquisition of permission information in the relay apparatus is not limited to storing of received permission information (for example, the access token) in a non-volatile memory in the relay apparatus, but includes a case where the relay apparatus temporarily acquires permission information (for example, a case where the relay apparatus receives permission information and temporarily stores the permission information in the RAM or the like).

In the embodiment, the MFP 100 cannot interpret HTML and thus cannot display web pages provided by the service providing apparatus 500. However, the aspect of the disclosure is applicable to a communication system in which a communication apparatus is configured to be able to use a service through a relay apparatus, and thus is also applicable to a case where the communication apparatus can interpret information provided by the service providing apparatus. In other words, the aspect of the disclosure is applicable to any communication system in which a relay apparatus can interpret information communicated between an MFP and a service providing apparatus and between the relay apparatus and a service providing apparatus, and a relay apparatus and a communication apparatus can interpret information communicated between the relay apparatus and the communication apparatus. Also, the language used for communication between the communication apparatus and the relay apparatus may be a language, such as Json, other than XML.

What is claimed is:

1. A relay system comprising:
   a plurality of service providing apparatuses, each of which is configured to provide at least one of an upload service of an electronic file and a download service of an electronic file;
   a relay apparatus configured to communicate with the plurality of service providing apparatuses through the Internet, the relay apparatus being configured to request the plurality of service providing apparatuses to transmit upload destination information which is used for requesting the plurality of service providing apparatuses to provide at least one of the upload service and the download service;
   a communication terminal configured to communicate with the relay apparatus through the Internet, the communication terminal being configured to request the plurality of service providing apparatus to provide at least one of the upload service and the download service using the upload destination information; and
a browser-equipped apparatus which is provided with a browser and is configured to transmit a first request to the relay apparatus in response to receiving a first user input,
wherein the relay apparatus includes:
  a first communication unit;
  a first storage; and
  a first controller,
wherein the communication terminal includes:
  a second communication unit;
  a display unit;
  an input receipt unit;
  a second storage; and
  a second controller,
wherein the first controller of the relay apparatus controls the first communication unit to transmit first screen data to the browser-equipped apparatus in response to receiving from the browser-equipped apparatus via the first communication unit the first request, wherein the first screen data causes the browser-equipped apparatus to display a first screen which allows a user to select one of the plurality of service providing apparatuses;
wherein the browser-equipped apparatus displays the first screen in response to receiving the first screen data, and transmits a second request to the first communication unit in response to the user selecting one of the plurality of service providing apparatuses through the first displayed screen, the second request including information indicative of the service providing apparatus selected by the user;
wherein the first controller of the relay apparatus controls the first communication unit to transmit, to the browser-equipped apparatus, in response to receiving the second request transmitted from the browser-equipped apparatus after the first communication unit transmits the first screen data: a first command which commands the browser-equipped apparatus to access a login page of the selected service providing apparatus; and a URL indicative of the relay apparatus;
wherein the browser-equipped apparatus accesses the login page of the selected service providing apparatus according to the first command and transmits, to the selected service providing apparatus, the URL and a first account and a first password which are input by the user;
wherein in response to receiving the first account and the first password, the selected service providing apparatus determines whether the first account and the first password correspond to a second account, indicative of a user registered in the selected service providing apparatus, and a second password of the second account;
wherein if the first account and the first password correspond to the second account and the second password, the selected service providing apparatus issues first authentication information, and transmits, to the browser-equipped apparatus, a second command which is a command for redirecting to the relay apparatus and includes the URL received from the browser-equipped apparatus;
wherein the browser-equipped apparatus accesses the relay apparatus according to the URL included in the second command and transmits to the relay apparatus a third request which includes the first authentication information included in the second command;
wherein in response to receiving the third request, the first controller of the relay apparatus issues first provisional registration information, and stores, in the first storage, the issued first provisional registration information, the first authentication information included in the third request and second identification information for identifying the selected service providing apparatus in such a manner that the first provisional registration information, the first authentication information and the second identification information are associated with each other;
wherein the first controller of the relay apparatus controls the first communication unit to transmit the first provisional registration information to the browser-equipped apparatus;
wherein in response to receiving the first provisional registration information transmitted from the relay apparatus, the browser-equipped apparatus displays the received first provisional registration information;
wherein in response to receiving a second user input by the input receipt unit, the second controller of the communication terminal controls the second communication unit to transmit a fourth request to the first communication unit of the relay apparatus;
wherein in response to receiving the fourth request, the first controller of the relay apparatus controls the first communication unit to transmit, to the communication terminal, second screen data which causes the communication terminal to display a second screen which allows the user to input second provisional registration information;
wherein in response to receiving, by the second communication unit, the second screen data transmitted from the relay apparatus, the second controller of the communication terminal controls the display unit to display the second screen;
wherein after the display unit displays the second screen, the second controller of the communication terminal controls the second communication unit to transmit to the relay apparatus the second provisional registration information received by the input receipt unit;
wherein the first controller of the relay apparatus determines whether the second provisional registration information received by the first communication unit corresponds to the first provisional registration information stored in the first storage;
wherein if the first controller determines that the second provisional registration information corresponds to the first provisional registration information stored in the first storage, the first controller controls the first communication unit to transmit a fifth request which includes the first authentication information associated with the first provisional registration information and stored in the first storage, to the service providing apparatus which is identified by the second identification information which corresponds to the first provisional registration information and is stored in the first storage;
wherein the service providing apparatus identified by the second identification information determines whether the first authentication information included in the received fifth request is stored in the service providing apparatus identified by the second identification information;
wherein if the service providing apparatus identified by the second identification information determines that the first authentication information stored in the received fifth request is stored in the service providing apparatus identified by the second identification information, the service providing apparatus identified by the second identification information issues an access token and transmits the issued access token to the relay apparatus which transmitted the fifth request;

wherein in response to receiving, by the first communication unit, the access token, the first controller of the relay apparatus controls the first communication unit to transmit the received access token to the communication terminal;

wherein in response to receiving, by the second communication unit, the access token, the second controller of the communication terminal stores the access token received by the second communication unit in the second storage;

wherein in response to receiving, by the input receipt unit, a third input which selects one of the plurality of service providing apparatuses after the second storage stores the access token, the second controller of the communication terminal controls the second communication unit to transmit to the relay apparatus a sixth request including third identification information identifying the service providing apparatus selected by the third input and the access token stored in the second storage;

wherein in response to receiving, by the first communication unit, the sixth request and access token transmitted from the communication terminal, the first controller of the relay apparatus generates second authentication information using the access token received from the communication terminal and key information of the relay apparatus, and controls the first communication unit to transmit the generated second authentication information to the service providing apparatus identified by the third identification information and transmit a seventh request to the service providing apparatus identified by the third identification information;

wherein in response to receiving the seventh request transmitted from the relay apparatus, the service providing apparatus identified by the third identification information authenticates the relay apparatus using the second authentication information;

wherein in response to receiving the second authentication information and the seventh request transmitted from the relay apparatus, if the service providing apparatus identified by the third identification information authenticates the relay apparatus using the second authentication information, the service providing apparatus identified by the third identification information transmits the upload destination information to the relay apparatus;

wherein in response to receiving, by the first communication unit, the upload destination information transmitted from the service providing apparatus identified by the third identification information, the first controller of the relay apparatus controls the first communication unit to transmit a third command including the received upload destination information to the communication terminal;

wherein in response to receiving the third command by the second communication unit, the second controller of the communication terminal transmits to the service providing apparatus identified by the second identification information an eighth request using the upload destination information included in the third command, the eighth request being a request for requesting the service providing apparatus identified by the second identification information to provide at least one of the upload service and the download service of the electronic file; and wherein in response to receiving the eighth request transmitted from the communication terminal, the service providing apparatus identified by the second identification information provides at least one of the upload service and the download service of the electronic file.

2. The relay system according to claim 1, wherein an amount of information of the provisional registration information is less than that of the first authentication information.

3. The relay system according to claim 1, wherein after the first communication unit of the relay apparatus transmits the access token to the communication terminal which transmits the first provisional registration information, the first controller does not allow the first storage to store the access token.

4. The relay system according to claim 1, wherein
the relay apparatus transmits to the service providing apparatus indicated by the information included in the second request a ninth request and the URL;
in response to the ninth request, the service providing apparatus selected by the user issues a request token and transmits the issued request token to the relay apparatus; and
the relay apparatus transmits, to the browser-equipped apparatus, the first command and the request token received from the service providing apparatus.

5. The relay system according to claim 1, wherein
if the first account and the first password correspond to the second account and the second password, the selected service providing apparatus transmits a permission confirmation page to the browser-equipped apparatus, and
if the user accepts use of the service providing apparatus in the permission confirmation page, the browser-equipped apparatus transmits an acceptance notification to the selected service providing apparatus and the service providing apparatus selected by the user transmits the second command to the browser-equipped apparatus.

6. The relay system according to claim 1,
wherein when the first controller of the relay apparatus controls the first communication unit to transmit the first command to the browser-equipped apparatus, the first communication unit transmits, to the browser-equipped apparatus, first identification information for identifying the relay apparatus; and
wherein when the selected service providing apparatus issues the first authentication information, the selected service providing apparatus stores the issued first authentication information in association with the first identification information.

7. A relay apparatus configured to communicate with a plurality of service providing apparatuses, each of which is configured to provide at least one of an upload service of an electronic file and a download service of an electronic file; a communication terminal configured to communicate with the relay apparatus through the Internet, the communication terminal being configured to request the plurality of service providing apparatus to provide at least one of the upload service and the download service using upload destination information; and a browser-equipped apparatus which is provided with a browser and is configured to transmit a first request to the relay apparatus in response to receiving a first user input, the relay apparatus being configured to communicate with the plurality of service providing apparatuses through the Internet, the relay apparatus being configured to request the plurality of service providing apparatuses to transmit the upload destination information which is used for requesting the plurality of service providing apparatuses to provide at least one of the upload service and the download service, the relay apparatus comprising:

a communication unit;
a storage; and
a controller,
wherein the controller of the relay apparatus controls the communication unit to transmit a first screen data to the browser-equipped apparatus in response to receiving from the browser-equipped apparatus via the communication unit the first request transmitted from the browser-equipped apparatus, the first screen data being for causing the browser-equipped apparatus to display a first screen which allows a user to select one of the plurality of service providing apparatuses;
wherein the controller of the relay apparatus, in response to the relay apparatus receiving a second request transmitted from the browser-equipped apparatus after the communication unit transmits the first screen data, controls the communication unit to transmit, to the browser-equipped apparatus: a first command which commands the browser-equipped apparatus to access a login page of the selected service providing apparatus; first identification information for identifying the relay apparatus; and a URL indicative of the relay apparatus;
wherein in response to receiving a third request, which includes first authentication information transmitted from the browser-equipped apparatus after the communication unit transmits the first command and includes the URL, the controller of the relay apparatus issues first provisional registration information, and stores, in the storage: the issued first provisional registration information; the first authentication information included in the third request; and second identification information for identifying the selected service providing apparatus;
wherein the controller of the relay apparatus stores, in the storage, each of the issued first provisional registration information, the first authentication information included in the third request, and the second identification information for identifying the selected service providing apparatus in such a manner that the issued first provisional registration information, the first authentication information and the second identification information are associated with each other;
wherein the controller of the relay apparatus controls the communication unit to transmit the first provisional registration information to the browser-equipped apparatus;
wherein in response to receiving, by the communication unit, a fourth request transmitted from the communication terminal, the controller of the relay apparatus controls the communication unit to transmit, to the communication terminal, second screen data which causes the communication terminal to display a second screen which allows the user to input second provisional registration information;
wherein the communication unit receives the second registration information from the communication terminal;

wherein the controller of the relay apparatus determines whether the second provisional registration information received by the communication unit from the communication terminal corresponds to the first provisional registration information stored in the storage;
wherein if the controller determines that the second provisional registration information received by the communication unit corresponds to the first provisional registration information stored in the storage, the controller controls the communication unit to transmit a fifth request, which includes the first authentication information associated with the first provisional registration information, to the service providing apparatus which is identified by the second identification information corresponding to the first provisional registration information;
wherein in response to receiving, by the communication unit, an access token transmitted from the service providing apparatus identified by the second identification information after the communication unit transmits the fifth request, the controller of the relay apparatus controls the communication unit to transmit the received access token to the communication;
wherein in response to receiving, from the communication terminal, a sixth request including third identification information identifying the selected service providing apparatus and the access token, the controller of the relay apparatus controls the communication unit to transmit a seventh request which is a request using the received access token to the service providing apparatus identified by the third identification information;
wherein in response to receiving, by the communication unit, the upload destination information transmitted from the service providing apparatus identified by the third identification information, the controller of the relay apparatus controls the communication unit to transmit a third command including the received upload destination information to the communication terminal.

8. The relay apparatus according to claim 7, wherein
the relay apparatus transmits to the selected service providing apparatus a ninth request and the URL, and
the relay apparatus transmits, to the browser-equipped apparatus, the first command including a request token received from the selected service providing apparatus.

9. A communication terminal configured to communicate with a plurality of service providing apparatuses, each of which is configured to provide at least one of an upload service of an electronic file and a download service of an electronic file; and a relay apparatus configured to communicate with the plurality of service providing apparatuses through the Internet, the relay apparatus being configured to request the plurality of service providing apparatuses to transmit upload destination information which is used for requesting the plurality of service providing apparatuses to provide at least one of the upload service and the download service; and a browser-equipped apparatus which is provided with a browser and is configured to transmit a first request to the relay apparatus in response to receiving a first user input, the communication terminal being configured to communicate with the relay apparatus through the Internet, the communication terminal being configured to request the plurality of service providing apparatus to provide at least one of the upload service and the download service using the upload destination information, the communication terminal comprising:
- a communication unit;
- a display unit;
- an input receipt unit;
- a storage; and
- a controller,
- wherein in response to receiving a second user input by the input receipt unit, the controller of the communication terminal controls the communication unit to transmit a fourth request to the relay apparatus;
- wherein in response to receiving, by the communication unit, second screen data which allows the user to input second provisional registration information and is transmitted to the communication terminal from the relay apparatus, the controller of the communication terminal controls the display unit to display the second screen data;
- wherein after the display unit displays the second screen data, the controller of the communication terminal controls the communication unit to transmit the second provisional registration information from the communication terminal to the relay apparatus, the second registration information being input by the user through the input receipt unit;
- wherein in response to receiving, by the communication unit, an access token transmitted from the relay apparatus after the communication unit transmits the second provisional registration information to the relay apparatus, the controller of the communication terminal stores the access token received by the communication unit in the storage;
- wherein in response to receiving, by the input receipt unit, a third input which selects one of the plurality of service providing apparatuses after the storage stores the access token, the controller of the communication terminal controls the communication unit to transmit to the relay apparatus the access token stored in the storage and a sixth request including third identification information identifying the service providing apparatus selected by the third input; and
- wherein in response to receiving a third command including the upload destination information, the controller of the communication terminal transmits to the service providing apparatus, identified by second identification information, an eighth request using the upload destination information included in the third command, the eighth request being a request for requesting the service providing apparatus identified by the second identification information to provide at least one of the upload service and the download service of the electronic file.

10. A relay system comprising:
- a plurality of service providing apparatuses, each of which is configured to provide at least one of an upload service of an electronic file and a download service of an electronic file; and
- a relay apparatus configured to communicate with the plurality of service providing apparatuses through the Internet, the relay apparatus being configured to request the plurality of service providing apparatuses to transmit upload destination information which is used for requesting the plurality of service providing apparatuses to provide at least one of the upload service and the download service;
- wherein the relay apparatus includes:
  - a communication unit;
  - a storage; and
  - a controller,
- wherein in response to receiving by the communication unit a first request from a specific device comprising a browser-equipped apparatus, the controller of the relay apparatus controls the communication unit to transmit a first screen data to the specific device, wherein the first screen data causes the specific device to display a first screen which allows a user to select one of the plurality of service providing apparatuses;
- wherein the controller of the relay apparatus controls the communication unit to transmit, to the specific device, a first command which commands the specific device to access a login page of the selected service providing apparatus and a URL indicative of the relay apparatus in response to receiving a second request transmitted from the specific device after the communication unit transmits the first screen data, the second request including information indicative of the selected service providing apparatus selected by the specific device;
- wherein in response to receiving a first account and a first password transmitted from the specific device, the selected service providing apparatus determines whether the first account and the first password received from the specific device correspond to a second account indicative of the user registered in the selected service providing apparatus and a second password of the second account;
- wherein if the first account and the first password correspond to the second account and the second password, the selected service providing apparatus issues first authentication information, stores the issued first authentication information in association with first identification information, and transmits, to the specific device, a second command which is a command for redirecting to the relay apparatus and includes the URL;
- wherein in response to receiving the first authentication information transmitted from the specific device, the controller of the relay apparatus stores, in the storage, the first authentication information;
- wherein the controller controls the communication unit to transmit a third request which includes the first authentication information to the selected service providing apparatus;
- wherein the selected service providing apparatus determines whether the first authentication information stored in the received third request is stored in the storage and corresponds to the first identification information which identifies the relay apparatus which transmitted the third request;
- wherein if the selected service providing apparatus identified by the second identification information determines that the first authentication information stored in the received third request is stored in the selected service providing apparatus identified by the second identification information and corresponds to the first identification information which identifies the relay apparatus which transmitted the third request, the selected service providing apparatus issues an access token and transmits the issued access token to the relay apparatus;
- wherein the relay apparatus receives, by the communication unit, the access token transmitted from the selected service providing apparatus, and stores the access token in the storage, and wherein the relay apparatus controls the communication unit to transmit a fourth request to any of the plurality of service providing apparatus after the communication unit transmits the third request;

wherein the service providing apparatus to which the fourth request is transmitted is identified by second identification information included in a fifth request received by the communication unit;

wherein the fourth request is a request using the access token stored in the storage;

wherein in response to receiving the fourth request transmitted from the relay apparatus, the service providing apparatus to which the fourth request is transmitted determines whether the fourth request is a request using the access token issued by the service providing apparatus to which the fourth request is transmitted;

wherein if the service providing apparatus to which the fourth request is transmitted determines that the fourth request is a request using the access token issued by the service providing apparatus to which the fourth request is transmitted, the service providing apparatus to which the fourth request is transmitted transmits the upload destination information to the relay apparatus;

wherein in response to receiving, by the communication unit, the upload destination information transmitted from the service providing apparatus to which the fourth request is transmitted, the controller of the relay apparatus controls the communication unit to transmit the received upload destination information to the specific device;

wherein the specific device is configured to request the service providing apparatus to which the fourth request is transmitted to provide at least one of upload and download of the electronic file using the upload destination information; and wherein the fifth request includes the second identification information identifying the service providing apparatus selected by the specific device which transmits the fifth request.

11. The relay system according to claim 10, wherein the specific device which transmits the first request is different from the relay apparatus which transmits the third request.

* * * * *

UNITED STATES PATENT AND TRADEMARK OFFICE
CERTIFICATE OF CORRECTION

PATENT NO. : 9,860,231 B2
APPLICATION NO. : 13/288766
DATED : January 2, 2018
INVENTOR(S) : Masafumi Miyazawa It is certified that error appears in the above-identified patent and that said Letters Patent is hereby corrected as shown below:

In the Claims

Claim 1:
Column 22, Line 51: After "request", please add -- , --.

Claim 9:
Column 26, Line 55: After "electronic file;" delete "and".

Signed and Sealed this
Twenty-eighth Day of August, 2018

Andrei Iancu
*Director of the United States Patent and Trademark Office*